United States Patent
Schmiegel

(10) Patent No.: US 6,916,887 B2
(45) Date of Patent: Jul. 12, 2005

(54) CURABLE BASE-RESISTANT FLUOROELASTOMERS

(75) Inventor: Walter Werner Schmiegel, Wilmington, DE (US)

(73) Assignee: DuPont Dow Elastomers LLC, Wilmington, DE (US)

(*) Notice: Subject to any disclaimer, the term of this patent is extended or adjusted under 35 U.S.C. 154(b) by 181 days.

(21) Appl. No.: 10/404,368

(22) Filed: Apr. 1, 2003

(65) Prior Publication Data

US 2003/0208004 A1 Nov. 6, 2003

Related U.S. Application Data

(60) Provisional application No. 60/377,546, filed on May 2, 2002.

(51) Int. Cl.$^7$ .............................................. C08F 116/12
(52) U.S. Cl. ..................... 525/326.3; 525/384; 526/247
(58) Field of Search .............................. 525/326.3, 384; 526/247

(56) References Cited

U.S. PATENT DOCUMENTS

| | | |
|---|---|---|
| 4,529,784 A | 7/1985 | Finlay |
| 4,694,045 A | 9/1987 | Moore |
| 5,985,983 A | 11/1999 | Yamada et al. |
| 6,329,042 B1 | 12/2001 | Yamada et al. |
| 6,329,469 B1 | 12/2001 | Bowers et al. |
| 2002/0002258 A1 | 1/2002 | Hung et al. |

FOREIGN PATENT DOCUMENTS

| | | |
|---|---|---|
| EP | 208314 | 1/1987 |
| EP | 365053 | 4/1990 |
| JP | 5224956 | 7/1977 |
| WO | WO 9702301 | 1/1997 |
| WO | WO 01/81464 | * 11/2001 |
| WO | WO 02092687 | 11/2002 |

* cited by examiner

Primary Examiner—Bernard Lipman

(57) ABSTRACT

A base resistant, substantially amorphous fluoroelastomer comprising (1) 10–40 mole percent ethylene units, (2) 32–60 mole percent tetrafluoroethylene units, (3) 20–40 mole percent perfluoro ether units selected from the group consisting of perfluoro(alkyl vinyl ethers), perfluoro(alkyl alkenyl ethers) and perfluoro(alkoxy alkenyl ethers), and (4) 0.1 to 15 mole percent of a cure site monomer selected from the group consisting of i) perfluoroalkyl ethylenes and ii) perfluoroalkoxy ethylenes. Such fluoroelastomers may be vulcanized with polyhydroxy curing agents. The resulting vulcanized fluoroelastomers are resistant to attack by amines, strong bases and hydrogen sulfide and possess a combination of good low temperature and high temperature properties and they are resistant to oil swell.

17 Claims, No Drawings

US 6,916,887 B2

CURABLE BASE-RESISTANT FLUOROELASTOMERS

CROSS-REFERENCE TO RELATED APPLICATIONS

This application claims the benefit of U.S. Provisional Application No. 60/377,546 filed May 2, 2002.

FIELD OF THE INVENTION

This invention relates to polyhydroxy curable fluoroelastomers comprising copolymerized units of 1) ethylene, 2) a perfluoro ether such as a perfluoro(alkyl vinyl ether) or a perfluoro(alkyl or alkoxy alkenyl ether), 3) tetrafluoroethylene, and 4) a cure site monomer selected from the group consisting of i) perfluoroalkyl ethylenes and ii) perfluoroalkoxy ethylenes.

BACKGROUND OF THE INVENTION

Base resistant specialty fluoroelastomers made from copolymers of ethylene (E), a perfluoro(alkyl vinyl ether) (PAVE), tetrafluoroethylene (TFE) and a cure site monomer are known in the art (U.S. Pat. No. 4,694,045). In addition to being resistant to attack by strong bases, these fluoroelastomers have good sealing properties at both low and high temperatures and exhibit low swell in oil.

In order to fully develop physical properties such as tensile strength, elongation, and compression set, elastomers must be cured, i.e. crosslinked. In the case of fluoroelastomers, this is generally accomplished by mixing uncured polymer (i.e. fluoroelastomer gum) with a polyfunctional curing agent and heating the resultant mixture, thereby promoting chemical reaction of the curing agent with active sites along the polymer backbone or side chains. Interchain linkages produced as a result of these chemical reactions cause formation of a crosslinked polymer composition having a three-dimensional network structure. Commonly used curing agents for fluoroelastomers include difunctional nucleophilic reactants, such as polyhydroxy compounds or diamines. Alternatively, peroxidic curing systems containing organic peroxides and unsaturated coagents, such as polyfunctional isocyanurates, may be employed.

U.S. Pat. No. 4,694,045 discloses several cure site monomers which may be incorporated into E/PAVE/TFE specialty fluoroelastomers. These include brominated or iodinated alpha-olefins, and various halogenated vinyl ethers. Such fluoroelastomers may be cured with peroxides or tin compounds, but not polyhydroxy curatives. However, in many end use applications, it would be beneficial to be able to cure E/PAVE/TFE fluoroelastomers with polyhydroxy compounds because of the improved mold release and superior (i.e. lower) compression set resistance that is imparted by this type of crosslinking system.

Thus, it would be particularly desirable to have an improved specialty E/PAVE/TFE fluoroelastomer that is resistant to alkaline fluids and oil swell and which readily crosslinks with polyhydroxy cure systems to form cured articles having good tensile properties and compression set resistance.

SUMMARY OF THE INVENTION

It has been surprisingly found that the introduction of a cure site monomer selected from the group consisting of i) perfluoroalkyl ethylenes and ii) perfluoroalkoxy ethylenes into ethylene/perfluoro ether/tetrafluoroethylene copolymers improves the polyhydroxy curing of these specialty fluoroelastomers without significantly diminishing the resistance of these fluoroelastomers to alkaline fluids or oil and without significantly altering the low and high temperature sealing capabilities of these fluoroelastomers. The resulting cured fluoroelastomer articles have excellent compression set resistance and tensile properties.

Accordingly, an aspect of the present invention is a specialty fluoroelastomer comprising copolymerized units of 10 to 40 mole percent ethylene; 20 to 40 mole percent of a perfluoro ether selected from the group consisting of perfluoro(alkyl vinyl ethers), perfluoro(alkyl alkenyl ethers) and perfluoro(alkoxy alkenyl ethers); 32–60 mole percent tetrafluoroethylene; and 0.1 to 15 mole percent of a cure site monomer selected from the group consisting of i) perfluoroalkyl ethylenes and ii) perfluoroalkoxy ethylenes, with the proviso that if the perfluoro ether is a perfluoro(alkyl vinyl ether), the cure site monomer may not contain a bromine or iodine atom.

Another aspect of this invention is a curable fluoroelastomer composition comprising A) a specialty fluoroelastomer comprising copolymerized units of 10 to 40 mole percent ethylene; 20 to 40 mole percent of a perfluoro ether selected from the group consisting of perfluoro(alkyl vinyl ethers), perfluoro (alkyl alkenyl ethers) and perfluoro(alkoxy alkenyl ethers); 32–60 mole percent tetrafluoroethylene; and 0.1 to 15 mole percent of a cure site monomer selected from the group consisting of i) perfluoroalkyl ethylenes and ii) perfluoroalkoxy ethylenes;

B) 0.1 to 20 parts by weight per 100 parts fluoroelastomer of a polyhydroxy curing agent;

C) 1 to 30 parts by weight per 100 parts fluoroelastomer of an acid acceptor; and D) 0.1 to 20 parts per 100 parts fluoroelastomer of a vulcanization accelerator.

The polyhydroxy curing agent and vulcanization accelerator may be present as separate components or as the salt of the curing agent and accelerator.

DETAILED DESCRIPTION OF THE INVENTION

Fluoroelastomers of this invention comprise copolymerized units of 1) ethylene (E), 2) a perfluoro ether selected from the group consisting of perfluoro(alkyl vinyl ethers) (PAVE), perfluoro(alkyl alkenyl ethers) and perfluoro (alkoxy alkenyl ethers), 3) tetrafluoroethylene (TFE), and 4) a cure site monomer selected from the group consisting of i) perfluoroalkyl ethylenes and ii) perfluoroalkoxy ethylenes, with the proviso that if the perfluoro ether is a perfluoro (alkyl vinyl ether), the cure site monomer may not contain a bromine or iodine atom.

Minor amounts (i.e. less than about 20 mole percent total) of other copolymerizable monomers may also be present in the fluoroelastomers of this invention. Examples of such monomers include, but are not limited to chlorotrifluoroethylene; vinyl fluoride; propylene; isobutene; and bromine- or iodine-containing cure site monomers such as $CF_2=CFOCF_2CF_2CF_2OCF_2CF_2Br$; 1-bromo-2,2-difluoroethylene; bromotrifluoroethylene; 4-bromo-1,1,2-trifluorobutene-1;2-bromoperfluoro(ethyl vinyl) ether; 3-bromoperfluoro(propyl vinyl) ether; and 4-iodo-3,3,4,4-tetrafluorobutene-1. Alternatively, bromine or iodine cure sites may be introduced onto the fluoroelastomer polymer chain ends by use of iodinated or brominated chain transfer agents such as methylene iodide or 1,4-diiodoperfluorobutane during polymerization. The presence of brominated or iodinated groups permits the fluoroelastomers of this invention to be cured by organic peroxides in addition to polyhydroxy curatives.

Generally the fluoroelastomers of this invention contain between 10 to 40 (preferably between 20 to 40) mole percent copolymerized units of ethylene, based on the total moles of copolymerized monomers. Less ethylene adversely effects the low temperature sealing performance of the fluoroelastomers, while more ethylene adversely effects the base resistance and oil swell resistance properties of the fluoroelastomers.

The fluoroelastomers of this invention typically contain between 20 to 40 (preferably between 20 to 30) mole percent copolymerized units of a perfluoro ether selected from the group consisting of perfluoro(alkyl vinyl ethers), perfluoro (alkyl alkenyl ethers) and perfluoro(alkoxy alkenyl ethers), based on the total moles of copolymerized monomers. Less perfluoro ether will negatively impact the low temperature sealing performance of the fluoroelastomers of the invention, while more perfluoro ether causes the polymer to be more expensive to produce.

Perfluoro(alkyl vinyl ethers) suitable for use as monomers include those of the formula

$$CF_2=CFO(R_fO)_n(R_{f'O})_mR_{f''} \quad (I)$$

where $R_f$ and $R_{f'}$ are different linear or branched perfluoroalkylene groups of 2–6 carbon atoms, m and n are independently 0–10, and $R_{f''}$ is a perfluoroalkyl group of 1–6 carbon atoms.

A preferred class of perfluoro(alkyl vinyl ethers) includes compositions of the formula

$$CF_2=CFO(CF_2CFXO)_nR_f \quad (II)$$

where X is F or $CF_3$, n is 0–5, and $R_f$ is a perfluoroalkyl group of 1–6 carbon atoms.

A most preferred class of perfluoro(alkyl vinyl ethers) includes those ethers wherein n is 0 or 1 and $R_f$ contains 1–3 carbon atoms. Examples of such perfluorinated ethers include perfluoro(methyl vinyl ether) (PMVE) and perfluoro (propyl vinyl ether) (PPVE). Other useful monomers include compounds of the formula

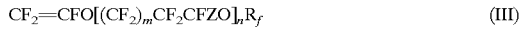

$$CF_2=CFO[(CF_2)_mCF_2CFZO]_nR_f \quad (III)$$

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1.

Additional perfluoro(alkyl vinyl ether) monomers include compounds of the formula

$$CF_2=CFO[(CF_2CF\{CF_3\}O)_n(CF_2CF_2CF_2O)_m(CF_2)_p]C_xF_{2x+1} \quad (IV)$$

where m and n independently=0–10, p=0–3, and x=1–5. Preferred members of this class include compounds where n=0–1, m=0–1, and x=1.

Additional examples of useful perfluoro(alkyl vinyl ethers) include

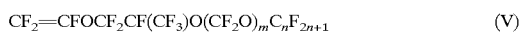

$$CF_2=CFOCF_2CF(CF_3)O(CF_2O)_mC_nF_{2n+1} \quad (V)$$

where n=1–5, m=1–3, and where, preferably, n=1.

Perfluoro(alkyl alkenyl ethers) suitable for use as monomers include those of the formula VI

$$R_fO(CF_2)_nCF=CF_2 \quad (VI)$$

where $R_f$ is a perfluorinated linear or branched aliphatic group containing 1–20, preferably 1–10, and most preferably 1–4 carbon atoms and n is an integer between 1 and 4. Specific examples include, but are not limited to perfluoro (propoxyallyl ether) and perfluoro(propoxybutenyl ether).

Perfluoro(alkoxy alkenyl ethers) differ from perfluoro (alkyl alkenyl ethers) in that $R_f$ in formula VI contains at least one oxa group in the aliphatic chain. A specific example includes, but is not limited to perfluoro(methoxyethoxyallyl ether).

Also contained in the fluoroelastomers of this invention are between 32–60 (preferably 40 to 50) mole percent copolymerized units of tetrafluoroethylene, based on the total moles of copolymerized monomers. Less TFE will adversely effect oil swell resistance whereas higher levels of TFE may introduce crystallinity, thus negatively impacting elastomer properties such as elongation and compression set.

The fluoroelastomers of this invention also contain 0.1 to 15 (preferably 2 to 10, most preferably 2–6) mole percent (based on the total moles of copolymerized monomers) of copolymerized units of a cure site monomer. The cure site monomer is selected from the group consisting of i) perfluoroalkyl ethylenes and vii) perfluoroalkoxy ethylenes. By "perfluoroalkyl ethylenes" is meant olefins of the formula VII

$$R_f-(CF_2)_n-CH=CH_2 \quad (VII)$$

wherein $R_f$ is a perfluorinated alkyl group containing between 1 and 7 (preferably between 1 and 4) carbon atoms and n is an integer between 1 and 6 (preferably between 1 and 4) and wherein the total number of carbon atoms in the perfluoroalkyl ethylene is less than 10 (preferably less than 7). Optionally, a fluorine atom on one or more carbon atoms may be replaced by a chlorine, bromine or iodine atom, with the proviso that if the perfluoro ether employed in the fluoroelastomer is a perfluoro(alkyl vinyl ether), the cure site monomer may not contain a bromine or iodine atom.

By "perfluoroalkoxy ethylenes" is meant olefins of the same general formula (VII) as the perfluoroalkyl ethylenes above except wherein $R_f$ is a perfluorinated alkoxy group containing at least one oxygen atom in the chain. Specific examples of perfluoroalkyl and perfluoroalkoxy ethylenes include, but are not limited to $CF_3CF_2CH=CH_2$; $CF_3(CF_2)_3CH=CH_2$; $BrCF_2CF_2CH=CH_2$; and $CF_3CF_2OCF_2CF_2CH=CH_2$.

It is believed that during the polyhydroxy curing process, some copolymerized units of the cure site monomer, which are located adjacent to tetrafluoroethylene units in the fluoroelastomer polymer chain, dehydrofluorinate to form sites of unsaturation (i.e. C—C double bonds). These unsaturated sites are then available to react with polyhydroxy curatives to form crosslinks. Fluoroelastomers containing less than 0.1 mole percent units of one of these cure site monomers do not form a sufficient number of crosslinks to yield a cured product having desirable tensile properties for most end uses. Fluoroelastomers containing more than 15 mole percent of these cure site monomers are not desirable because i) the polymerization rate is reduced and ii) the base resistance property of the fluoroelastomer is reduced.

The fluoroelastomers of this invention are generally prepared by free radical emulsion or suspension polymerization. Preferably, the polymerizations are carried out in continuous, batch, or semi-batch emulsion processes well known in the art. The resulting fluoroelastomer latexes are usually coagulated by addition of electrolytes. The precipitated polymer is washed with water and then dried, for example in an air oven, to produce a substantially dry fluoroelastomer gum.

In a semi-batch emulsion polymerization process, a gaseous monomer mixture of a desired composition (initial monomer charge) is introduced into a reactor which contains an aqueous solution. Generally, the pH of the aqueous solution is controlled to between 1 and 8 (preferably 3–7), depending upon the type of fluoroelastomer being made. In addition, the initial aqueous solution may contain a nucleating agent, such as a fluoroelastomer seed polymer prepared previously, in order to promote fluoroelastomer latex particle formation and thus speed up the polymerization process.

The initial monomer charge contains a quantity of TFE, E, perfluoro ether and cure site monomer. The amount of monomer mixture contained in the initial charge is set so as to result in a reactor pressure between 0.5 and 10 MPa.

The monomer mixture is dispersed in the aqueous medium and, optionally, a chain transfer agent may also be added at this point while the reaction mixture is agitated, typically by mechanical stirring.

The temperature of the semi-batch reaction mixture is maintained in the range of 25° C.–130° C., preferably 50° C.–100° C. Polymerization begins when the initiator either thermally decomposes or reacts with reducing agent and the resulting radicals react with dispersed monomer.

Additional quantities of the gaseous major monomers and cure site monomer (incremental feed) are added at a controlled rate throughout the polymerization in order to maintain a constant reactor pressure at a controlled temperature. The polymerization pressure is controlled in the range of 0.5 to 10 MPa, preferably 1 to 6.2 MPa.

Polymerization times in the range of from 2 to 30 hours are typically employed in this semi-batch polymerization process.

A suitable continuous emulsion polymerization process differs from the semi-batch process in the following manner. In the continuous process, gaseous monomers and solutions of other ingredients such as water-soluble monomers, chain transfer agents, buffer, bases, polymerization initiator, surfactant, etc., are fed to the reactor in separate streams at a constant rate. The temperature of the continuous process reaction mixture is maintained in the range of 25° C.–130° C., preferably 80° C.–120° C.

Curable compositions of this invention generally contain the fluoroelastomer of this invention, a polyhydroxy curative, an acid acceptor and a vulcanization (or curing) accelerator. However, curable compositions of this invention may also contain a fluoroelastomer comprising copolymerized units of 1) ethylene, 2) a perfluoro(alkyl vinyl ether) such as perfluoro(methyl vinyl ether), 3) tetrafluoroethylene and 4) a bromine or iodine containing perfluoroalkyl or perfluoroalkoxy ethylene cure site monomer such as 4-bromo-3,3,4,4-tetrafluorobutene-1. Previously it was thought that the latter fluoroelastomer was only curable by a free radical (e.g. peroxide) curing processes. It has now been surprisingly discovered that these polymers may also be cured by polyhydroxy curatives.

In the case of fluoroelastomers which contain bromine or iodine atom cure sites, the curable compositions of this invention may, optionally, also contain an organic peroxide and a multifunctional curing coagent. Cured articles resulting from the latter compositions contain crosslinks due to both the polyhydroxy and peroxide curing systems and are sometimes referred to in the art as dual cured elastomers.

The curable compositions of this invention may, optionally, contain more than one type of base-resistant specialty fluoroelastomer (different from each other) in order to result in cured compositions having the desirable properties of both types of elastomers. By "base-resistant fluoroelastomer" is meant an elastomer containing no more than 5 wt. % copolymerized units of vinylidene fluoride (preferably no vinylidene fluoride units). For example, a copolymer of tetrafluoroethylene, propylene and 3,3,3-trifluoropropylene may be blended (by conventional elastomer blending techniques) with a copolymer of ethylene, perfluoro(methyl vinyl ether), tetrafluoroethylene and 4-bromo-3,3,4,4-tetrafluorobutene-1. The resulting blend may be co-cured with a polyhydroxy curative, or dual cured with both a polyhydroxy curative and an organic peroxide/coagent curing system. Depending upon the relative amount of each elastomer in the blend and whether the blend is co-cured or dual cured, properties such as glass transition temperature, cure rate, cure state, tensile properties, and demolding processability may be tailored for a particular end use.

The curable compositions of the invention contain between 0.1 to 20 parts by weight (preferably 1–3 parts) of polyhydroxy crosslinking agent per 100 parts fluoroelastomer. Typical polyhydroxy cross-linking agents include di-, tri-, and tetrahydroxybenzenes, naphthalenes, and anthracenes, and bisphenols of the formula

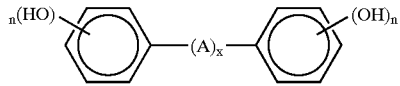

where A is a difunctional aliphatic, cycloaliphatic, or aromatic radical of 1–13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Phenolate salts are also active crosslinking agents, such as the dipotassium salt of bisphenol AF. Preferred polyhydroxy compounds include hexafluoroisopropylidene-bis(4-hydroxy-benzene) (i.e. bisphenol AF); 4,4'-isopropylidene diphenol (i.e. bisphenol A); 4,4'-dihydroxydiphenyl sulfone; and diaminobisphenol AF. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, heptafluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methyl-phenylene, dimethylphenylene, 1,4-naphthylene, 3-fluoro-1,4-naphthylene, and 2,6-naphthylene. Polyhydroxyphenols of the formula

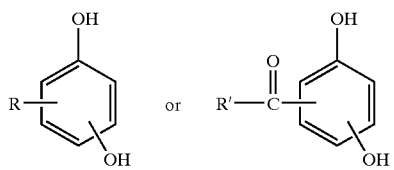

where R is H or an alkyl group having 1–4 carbon atoms or an aryl group containing 6–10 carbon atoms and R' is an alkyl group containing 1–4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethylhydroquinone, 2-t-butyl-hydroquinone; and such compounds as 1,5-dihydroxynaphthalene and 2,6-dihydroxynaphthalene.

Additional polyhydroxy curing agents include alkali metal salts of bisphenol anions, quaternary ammonium salts of bisphenol anions, tertiary sulfonium salts of bisphenol anions and quaternary phosphonium salts of bisphenol anions. For example, the salts of bisphenol A and bisphenol AF. Specific examples include the disodium salt of bisphenol AF, the dipotassium salt of bisphenol AF, the monosodium monopotassium salt of bisphenol AF and the benzyltriphenylphosphonium salt of bisphenol AF.

Quaternary ammonium and phosphonium salts of bisphenol anions and their preparation are discussed in U.S. Pat. Nos. 4,957,975 and 5,648,429. Bisphenol AF salts (1:1 molar ratio) with quaternary ammonium ions of the formula $R_1R_2R_3R_4N^+$, wherein $R_1$–$R_4$ are $C_1$–$C_8$ alkyl groups and at least three of $R_1$–$R_4$ are $C_3$ or $C_4$ alkyl groups are preferred. Specific examples of these preferred compositions include the 1:1 molar ratio salts of tetrapropyl ammonium-, methyltributylammonium- and tetrabutylammonium bisphenol AF. Such salts may be made by a variety of methods. For instance a methanolic solution of bisphenol AF may be mixed with a methanolic solution of a quaternary ammonium salt, the pH is then raised with sodium methoxide, causing an inorganic sodium salt to precipitate. Alternatively, a methanolic solution of bisphenol AF may first be neutralized with a molar equivalent of base (such as sodium methoxide). The quaternary ammonium salt is then added and an inorganic salt precipitates. After filtration, the tetraalkylammonium/BPAF salt may be isolated from solution by evaporation of the methanol. In another method for preparing the curative/accelerator salt, a methanolic solution of tetraalkylammonium hydroxide may be employed in place of the solution of quaternary ammonium salt, thus eliminating the precipitation of an inorganic salt and the need for its removal prior to evaporation of the methanol.

In addition, derivatized polyhydroxy compounds, such as mono- or diesters and trimethylsilyl ethers, are useful crosslinking agents. Examples of such compositions include diesters of phenols, such as the diacetate of bisphenol AF, the diacetate of sulfonyl diphenol, and the diacetate of hydroquinone.

The curable compositions of the invention also contain between 1 to 30 parts by weight (preferably 1 to 7 parts) of an acid acceptor per 100 parts fluoroelastomer. The acid acceptor is typically a strong organic base such as Proton Sponge® (available from Aldrich) or an oxirane, or an inorganic base such as a metal oxide, metal hydroxide, or a mixture of 2 or more of the latter. Metal oxides or hydroxides which are useful acid acceptors include calcium hydroxide, magnesium oxide, lead oxide, and calcium oxide. Calcium hydroxide and magnesium oxide are preferred.

Vulcanization accelerators which may be used in the curable compositions of the invention include tertiary sulfonium salts such as $[(C_6H_5)_2S^+(C_6H_{13})][Cl]^-$, and $[(C_6H_{13})_2 \ S(C_6H_5)]^+[CH_3CO_2]^-$ and quaternary ammonium, phosphonium, arsonium, and stibonium salts of the formula $R_5R_6R_7R_8Y^+X^-$, where Y is phosphorous, nitrogen, arsenic, or antimony; $R_5$, $R_6$, $R_7$, and $R_8$ are individually $C_1$–$C_{20}$ alkyl, aryl, aralkyl, alkenyl, and the chlorine, fluorine, bromine, cyano, —OR, and —COOR substituted analogs thereof, with R being $C_1$–$C_{20}$ alkyl, aryl, aralkyl, alkenyl, and where X is halide, hydroxide, sulfate, sulfite, carbonate, pentachlorothiophenolate, tetrafluoroborate, hexafluorosilicate, hexafluorophosphate, dimethyl phosphate, and $C_1$–$C_{20}$ alkyl, aryl, aralkyl, and alkenyl carboxylates and dicarboxylates. Particularly preferred are benzyltri-phenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, tributylallylphosphonium chloride, tributyl-2-methoxypropylphosphonium chloride, 1,8-diazabicyclo[5.4.0]undec-7-ene, and benzyldiphenyl(dimethylamino) phosphonium chloride. Other useful accelerators include methyltrioctylammonium chloride, methyltributylammonium chloride, tetrapropylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1,8-diazabicyclo(5.4.0)-7-undecenonium chloride, diphenylmethyltriphenylphosphonium chloride, allyltriphenylphosphonium chloride, tetrabutylphosphonium bromide, m-trifluoromethylbenzyltrioctylphosphonium chloride, and other quaternary compounds disclosed in U.S. Pat. Nos. 5,591,804; 4,912,171; 4,882,390; 4,259,463; 4,250,278 and 3,876,654. The amount of accelerator used is between 0.1 and 20 parts by weight per hundred parts fluoroelastomer. Preferably, 0.5–3.0 parts accelerator per hundred parts fluoroelastomer is used.

Optionally, the curable compositions of the invention may contain a second curing agent in the form of a combination of an organic peroxide and a multifunctional (i.e. polyunsaturated) coagent compound. Examples of organic peroxides which are particularly effective curing agents for fluoroelastomers include dialkyl peroxides or bis(dialkyl peroxides) which decompose at a temperature above 50° C. In many cases one will prefer to use a di-t-butylperoxide having a tertiary carbon atom attached to a peroxy oxygen. Among the most useful are 2,5-dimethyl-2,5-di(t-butylperoxy)hexyne-3 and 2,5-dimethyl-2,5-di(t-butylperoxy)hexane. Other peroxides can be selected from such compounds as dicumyl peroxide, dibenzoyl peroxide, t-butyl perbenzoate, and di[1,3-dimethyl-3-(t-butyl-peroxy) butyl]carbonate. Multifunctional coagents which cooperate with such peroxides to provide curing systems include methacrylates, allyl compounds, divinyl compounds, and polybutadienes. Specific examples of coagents include one or more of the following compounds: triallyl cyanurate; triallyl isocyanurate; tris(diallylamine-s-triazine); triallyl phosphite; hexaallyl phosphoramide, N,N-diallyl acrylamide; N,N,N',N'-tetraallyl terephthalamide; N,N,N',N'-tetraallyl malonamide; trivinyl isocyanurate; 2,4,6-trivinylmethyltrisiloxane; and tri(5-norbornene-2-methylene)cyanurate. If a peroxide cure system is present in the compounds of the invention, the organic peroxide is generally at a level between 0.2 to 7 parts by weight (preferably 1 to 3 parts) per 100 parts fluoroelastomer and the coagent is present at a level of 0.1 to 10 (preferably 2 to 5) parts by weight per 100 parts fluoroelastomer.

The curable composition of the invention may contain other additives, commonly used in elastomer compounding and processing. The latter may be introduced into the composition before addition of the curative, simultaneously with it, or following the addition. Typical additives include fillers, plasticizers, processing aids, antioxidants, pigments, and the like. The amount of such ingredients which is added will depend on the particular end use applications for which the cured compositions are adapted. Fillers, such as carbon black, clays, barium sulfate, calcium carbonate, magnesium silicate, and fluoropolymers are generally added in amounts of from 5–100 parts by weight per 100 parts fluoroelastomer. The amount of plasticizer used is generally from 0.5–5.0 parts by weight per 100 parts fluoroelastomer. Typical plasticizers include esters, such as dioctyl phthalate and dibutyl sebacate. Processing aids are generally used in amounts of from 0.1–2.0 parts by weight per 100 parts fluoroelastomer. Suitable processing aids include octadecylamine, tetramethylene sulfone, p-chlorophenyl sulfone, and waxes, for example, carnauba wax, that aid in the processing of the compositions.

The fluoroelastomer, polyhydroxy curative, acid acceptor, accelerator and any other ingredients are generally incorporated into the curable compositions of the invention by means of an internal mixer or rubber mill. The resulting composition may then be shaped (e.g. molded or extruded) and cured. Curing typically takes place at about 150°–200° C. for 1 to 60 minutes. Conventional rubber curing presses, molds, extruders, and the like provided with suitable heating and curing means can be used. Also, for maximum heat resistance and dimensional stability, it is preferred to carry out a post curing operation wherein the molded or extruded article is heated in an oven or the like for an additional period of about 1–48 hours, typically from about 180°–275° C., generally in an air atmosphere.

The polymers of the invention and curable compositions of the invention result in cured fluoroelastomer articles which have unusually good base resistance, tensile properties and compression set resistance. Such articles find application as gaskets, seals and tubing, particularly in automotive end uses.

The invention is now illustrated by the following embodiments in which all parts are by weight unless otherwise indicated.

EXAMPLES

Test Methods

Curing characteristics of the compositions described in the examples were measured according to the following test procedure:

Moving Disc Rheometer (MDR) ASTM D5289

Example 1

A polymer (Polymer A), not of this invention, was prepared by a continuous emulsion polymerization process, carried out at 110° C. in a well-stirred 4.0-liter stainless steel liquid full reaction vessel. An aqueous solution, consisting of 2.7 g/hour (g/h) ammonium persulfate, 22.2 g/h sodium phosphate dibasic heptahydrate, and 22.2 g/h of ammonium perfluorooctanoate, was fed to the reactor at a rate of 2 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 6 wt. % ethylene (E), 38 wt. % tetrafluoroethylene (TFE), 55 wt. % perfluoro(methyl vinyl ether) (PMVE) and 1 wt. % 4-bromo-3,3,4,4-tetrafluorobutene-1 (BTFB) fed through a diaphragm compressor. After 2.0 hours, collection of effluent dispersion was begun and lasted for 6 hours. The effluent polymer dispersion was separated from residual monomers in a degassing vessel at atmospheric pressure. The resulting fluoroelastomer latex was coagulated by addition of an aqueous calcium nitrate solution, filtered, and then the fluoroelastomer was washed with deionized water. The wet crumb was dried in an air oven at approximately 50°–65° C. to a moisture content of less than 1 wt. %. The resulting fluoroelastomer had a composition of about 8 wt. % E, 44 wt. % PMVE, 47 wt. % TFE and 1 wt. % BTFB with a ML-10 (121° C.) of about 50.

A curable composition of the invention (Sample 1) was made by mixing Polymer A with the salt of a polyhydroxy curative and accelerator, acid acceptor, and other ingredients on a conventional two-roll rubber mill, using standard mixing techniques employed in the elastomer industry. The formulations are shown in Table I.

Curing characteristics were measured according to the Test Methods. MDR measurements were of slabs at 177° C., 24 minute motor. The results are also shown in Table I. Surprisingly, Polymer A, a polymer heretofore thought only to be curable via a free radical mechanism, crosslinked with the polyhydroxy (bisphenol AF) curative.

TABLE I

| Ingredient, phr[1] | Sample 1 |
|---|---|
| Control Polymer A | 100 |
| TBAHS[2] | 0.15 |
| Bisphenol AF salt[3] | 3.2 |
| Elastomag 170[4] | 3 |
| Calcium Hydroxide | 6 |
| MT Carbon Black | 30 |
| Curing Characteristics | |
| $M_L$, dN · m | 1.76 |
| $M_H$, dN · m | 12.1 |
| $t_s2$, minutes | 1.45 |
| Tc50, minutes | 3.07 |
| tc90, minutes | 10.77 |

[1]phr is parts by weight per 100 parts by weight rubber (i.e. elastomer)
[2]tetrabutylammonium hydrogen sulfate
[3]methyltributylammonium BPAF salt 1:1 molar ratio
[4]magnesium oxide available from Morton Performance Chemicals, Inc.

Example 2

A curable composition of the invention (Sample 2) was made by mixing Polymer A (from Example 1) with the salt of a polyhydroxy curative and accelerator, acid acceptor, and other ingredients on a conventional two-roll rubber mill, using standard mixing techniques employed in the elastomer industry. Another curable composition of the invention (Sample 3) was prepared by a similar procedure except that the composition also contained an organic peroxide/coagent curing system. The formulations are shown in Table II.

Curing characteristics (MDR at 190° C., 24 minutes) were measured according to the Test Methods. The results are also shown in Table II. Sample 2 cured with Bisphenol AF, whereas Sample 3 was dual cured with both Bisphenol AF and peroxide, as indicated by the higher cure state (Delta M) of Sample 3.

TABLE II

| Ingredient, phr[1] | Sample 2 | Sample 3 |
|---|---|---|
| Polymer A | 100 | 100 |
| TBAHS[2] | 0.27 | 0.27 |
| Bisphenol AF Salt[3] | 3.2 | 3.2 |
| Elastomag 170 | 3.0 | 6.0 |
| Calcium Hydroxide | 6.0 | 6.0 |
| MT Carbon Black | 30 | 30 |
| Magnesium Stearate | 1.5 | 1.5 |
| Luperco 101-XL[4] | 0 | 3.0 |
| Diak 7[5] | 0 | 3.0 |
| Curing Characteristics | | |
| $M_L$, dN · m | 1.11 | 1.44 |
| $M_H$, dN · m | 9.65 | 13.89 |
| Delta M ($M_H$-$M_L$), dN · m | 8.54 | 12.45 |
| tc50, minutes | 1.43 | 0.68 |
| tc90, minutes | 7.68 | 4.08 |

[1]phr is parts by weight per 100 parts by weight rubber (i.e. elastomer)
[2]tetrabutylammonium hydrogen sulfate
[3]95 mol. % 1:1 molar methyltributylammonium/Bisphenol AF salt and 5 mol. % Bisphenol AF
[4]45% active 2,5-dimethyl-2,5-di(t-butylperoxy)-hexane on an inert substrate available from Atofina
[5]Triallyl isocyanurate available from DuPont Dow Elastomers L.L.C.

Example 3

A fluoroelastomer (Polymer B), not of this invention, comprising copolymerized units of tetrafluoroethylene (TFE), propylene (P) and 3,3,3-trifluoropropene-1 (TFP) was prepared according to WO 02/092683. Polymer B contained 76% TFE, 20% P and 4% TFP by weight.

A curable composition that is not of this invention (Sample A) was prepared by mixing Polymer B with the salt of a polyhydroxy curative and an accelerator, acid acceptor, and other ingredients on a conventional two-roll rubber mill, using standard mixing techniques employed in the elastomer industry. The formulation is shown in Table III.

The curing characteristics of a portion of Sample B were measured in an MDR (177° C., 24 minutes). Results are shown in Table III.

A curable composition of the invention (Sample 4) was made in the same manner in which Sample A was prepared except Polymer A (from Example 1) was mixed with curative/accelerator salt, acid acceptor, and other ingredients. The formulation is shown in Table III Curing characteristics of a portion of Sample 4 were measured in an MDR (177° C., 20 minutes). Results are shown in Table III.

A curable composition of this invention (Sample 5) was prepared by making a 50/50 (based on fluoroelastomer weight) blend of Sample A and Sample 4. Curing characteristics of a portion of Sample 5 were measured in an MDR (200° C., 24 minutes). Results are shown in Table III.

Surprisingly, the data in Table III indicate that the two different fluoroelastomers of Sample A and Sample 4 (TFE/P/TFP and E/TFE/PMVE/BTFB) present in blend Sample 5 co-cured. Had Sample A not co-cured with Sample 4, the blending of the fluoroelastomers would have resulted merely in a dilution of cures states of one fluoroelastomer by the other. The cure state (delta M) of Sample 5 would have been about 50% of that of either Sample A or Sample 4. Instead, the cure state of Sample 5 is greater than 90% of that of Sample A or Sample 4 indicating a co-cured single network of crosslinks.

TABLE III

| Ingredient, phr[1] | Sample A | Sample 4 | Sample 5 |
|---|---|---|---|
| Polymer A | 0 | 100 | 50 |
| Polymer B | 100 | 0 | 50 |
| Bisphenol AF Salt[2] | 3.190 | 3.19 | 3.19 |
| Magnesium Stearate | 0.75 | 0 | 0.38 |
| Elastomag 170 | 3 | 3 | 3 |
| Calcium Hydroxide | 6 | 6 | 6 |
| MT Carbon Black | 30 | 30 | 30 |
| TBAHS[3] | 0 | 0.28 | 0.14 |
| Curing Characteristics | | | |
| $M_L$, dN · m | 0.51 | 1.60 | 0.98 |
| $M_H$, dN · m | 12.3 | 12.6 | 11.3 |
| Delta M ($M_H$-$M_L$), dN · m | 11.8 | 11.0 | 10.3 |
| $t_s2$, minutes | 1.88 | 0.68 | 0.65 |
| tc90, minutes | 5.23 | 5.12 | 4.67 |

[1]phr is parts by weight per 100 parts by weight rubber (i.e. elastomer)
[2]95 mol. % 1:1 molar methyltributylammonium/Bisphenol AF salt and 5 mol. % Bisphenol AF
[3]tetrabutylammonium hydrogen sulfate

Example 4

A polymer (Polymer 1), of this invention, is prepared by a continuous emulsion polymerization process, carried out at 110° C. in a well-stirred 4.0-liter stainless steel liquid full reaction vessel. An aqueous solution, consisting of 2.7 g/hour (g/h) ammonium persulfate, 22.2 g/h sodium phosphate dibasic heptahydrate, and 22.2 g/h of ammonium perfluorooctanoate, is fed to the reactor at a rate of 2 L/hour. The reactor is maintained at a liquid-full level at a pressure of 6.2 MPa by means of a backpressure control valve in the effluent line. After 30 minutes, polymerization is initiated by introduction of a gaseous monomer mixture consisting of 6 wt. % ethylene (E), 38 wt. % tetrafluoroethylene (TFE), 55 wt. % perfluoro(methyl vinyl ether) (PMVE) and 1 wt. % $CF_3CF_2CH=CH_2$ fed through a diaphragm compressor. After 2.0 hours, collection of effluent dispersion is begun and lasts for 6 hours. The effluent polymer dispersion is then separated from residual monomers in a degassing vessel at atmospheric pressure. The resulting fluoroelastomer latex is coagulated by addition of an aqueous calcium nitrate solution, filtered, and then the fluoroelastomer is washed with deionized water. The wet crumb is dried in an air oven at approximately 50°–65° C. to a moisture content of less than 1 wt. %. The resulting fluoroelastomer has a composition of about 8 wt. % E, 44 wt. % PMVE, 47 wt. % TFE and 1 wt. % $CF_3CF_2CH=CH_2$ with a ML-10 (121° C.) of about 50.

A curable composition of the invention is made according to the method of Example 1 except that Polymer 1 is substituted for Polymer A. The resulting composition (Sample 6) cures in the MDR test at 177° C.

What is claimed is:

1. A specialty fluoroelastomer comprising copolymerized units of 10 to 40 mole percent ethylene; 20 to 40 mole percent perfluoro ether selected from the group consisting of perfluoro(alkyl vinyl ethers), perfluoro(alkyl alkenyl ethers) and perfluoro(alkoxy alkenyl ethers); 32–60 mole percent tetrafluoroethylene; and 0.1 to 15 mole percent of a cure site monomer having the formula $R_f$—$(CF_2)_n$—$CH=CH_2$ wherein $R_f$ is a perfluorinated alkyl group or perfluorinated alkoxy group containing between 1 and 7 carbon atoms, n is an integer between 1 and 6 and wherein the total number of carbon atoms in the cure site monomer is less than 10, with the proviso that if the perfluoro ether is a perfluoro(alkyl vinyl ether), the cure site monomer may not contain a bromine or iodine atom.

2. A specialty fluoroelastomer of claim 1 wherein said copolymerized units of ethylene are present in an amount between 20 and 40 mole percent; said copolymerized units of perfluoro ether in an amount between 20 and 30 mole percent; said copolymerized units of tetrafluoroethylene in an amount between 40 and 50 mole percent and said copolymerized units of cure site monomer in an amount between 2 and 10 mole percent.

3. A specialty fluoroelastomer of claim 2 wherein said perfluoro ether is perfluoro(methyl vinyl ether).

4. A curable fluoroelastomer composition comprising

A) a specialty fluoroelastomer comprising copolymerized units of 10 to 40 mole percent ethylene; 20 to 40 mole percent perfluoro ether selected from the group consisting of perfluoro(alkyl vinyl ethers), perfluoro(alkyl alkenyl ethers) and perfluoro(alkoxy alkenyl ethers); 32–60 mole percent tetrafluoroethylene; and 0.1 to 15 mole percent of a cure site monomer having the formula $R_f\text{—}(CF_2)_n\text{—}CH\text{=}CH_2$ wherein $R_f$ is a perfluorinated alkyl group or perfluorinated alkoxy group containing between 1 and 7 carbon atoms, n is an integer between 1 and 6 and wherein the total number of carbon atoms in the cure site monomer is less than 10;

B) 0.1 to 10 parts by weight per 100 parts fluoroelastomer of a polyhydroxy curing agent;

C) 1 to 20 parts by weight per 100 parts fluoroelastomer of an acid acceptor; and D) 0.1 to 10 parts per 100 parts fluoroelastomer of a vulcanization accelerator.

5. A curable fluoroelastomer composition of claim 4 wherein said specialty fluoroelastomer comprises copolymerized units of ethylene present in an amount between 20 and 40 mole percent; said copolymerized units of perfluoro ether in an amount between 20 and 30 mole percent; said copolymerized units of tetrafluoroethylene in an amount between 40 and 50 mole percent and said copolymerized units of cure site monomer in an amount between 2 and 10 mole percent.

6. A curable fluoroelastomer composition of claim 5 wherein said cure site monomer is 4-bromo-3,3,4,4-tetrafluorobutene-1.

7. A curable fluoroelastomer composition of claim 4 wherein said perfluoro ether in said specialty fluoroelastomer is perfluoro(methyl vinyl ether).

8. A curable fluoroelastomer composition of claim 4 further comprising E) 0.2 to 7 parts by weight per 100 parts fluoroelastomer of an organic peroxide and F) 0.1 to 10 parts by weight per 100 parts fluoroelastomer of a multifunctional coagent.

9. A curable fluoroelastomer composition of claim 4 further comprising a second specialty fluoroelastomer different from said specialty fluoroelastomer A).

10. A curable fluoroelastomer composition of claim 4 wherein said polyhydroxy curing agent B is a curing agent selected from the group consisting of i) dihydroxy-, trihydroxy-, and tetrahydroxy-benzenes, -naphthalenes, and -anthracenes;

ii) bisphenols of the formula

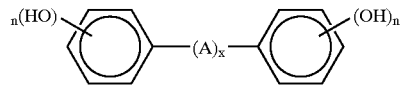

where A is a stable divalent radical; x is 0 or 1; and n is 1 or 2;

iii) dialkali salts of said bisphenols, iv) quaternary ammonium and phosphonium salts of said bisphenols, v) tertiary sulfonium salts of said bisphenols, and vi) esters of phenols.

11. A curable composition of claim 4 wherein said vulcanization accelerator D is chosen from the group consisting of quaternary ammonium salts, tertiary sulfonium salts and quaternary phosphonium salts.

12. A curable composition of claim 11 wherein said cure accelerator D is selected from the group consisting of i) quaternary ammonium salts of said polyhydroxy crosslinking agent (B), ii) quaternary phosphonium salts of said polyhydroxy crosslinking agent (B) and iii) tertiary sulfonium salts of said polyhydroxy crosslinking agent.

13. A curable fluoroelastomer composition comprising

A) a specialty fluoroelastomer comprising copolymerized units of 10 to 40 mole percent ethylene; 20 to 40 mole percent perfluoro ether selected from the group consisting of perfluoro(alkyl vinyl ethers), perfluoro(alkyl alkenyl ethers) and perfluoro(alkoxy alkenyl ethers); 32–60 mole percent tetrafluoroethylene; and 0.1 to 15 mole percent of a cure site monomer having the formula $R_f\text{—}(CF_2)_n\text{—}CH\text{=}CH_2$ wherein $R_f$ is a perfluorinated alkyl group or perfluorinated alkoxy group containing between 1 and 7 carbon atoms, n is an integer between 1 and 6 and wherein the total number of carbon atoms in the cure site monomer is less than 10;

B) a compound selected from the group consisting of i) quaternary ammonium salts of a bisphenol, ii) quaternary phosphonium salts of a bisphenol and iii) tertiary sulfonium salts of a bisphenol; and C) an acid acceptor.

14. A curable fluoroelastomer composition of claim 13 further comprising E) 0.2 to 7 parts by weight per 100 parts fluoroelastomer of an organic peroxide and F) 0.1 to 10 parts by weight per 100 parts fluoroelastomer of a multifunctional coagent.

15. A curable fluoroelastomer composition of claim 13 wherein said quaternary ammonium salt of a bisphenol is selected from the group consisting of a) a tetrapropylammonium/bisphenol AF salt, b) a methyltributylammonium/bisphenol AF salt, and c) a tetrabutylammonium/bisphenuol AF salt.

16. A curable fluoroelastomer composition of claim 13 wherein said quaternary ammonium salt of a bisphenol is a 1:1 molar ratio salt of a quaternary ammonium compound and bisphenol AF.

17. A curable fluoroelastomer composition of claim 13 further comprising a second specialty fluoroelastomer different from said specialty fluoroelastomer A).

* * * * *